United States Patent
Norton et al.

(10) Patent No.: US 7,743,383 B2
(45) Date of Patent: Jun. 22, 2010

(54) ADAPTIVE COOPERATIVE SCHEDULING

(75) Inventors: Scott J. Norton, San Jose, CA (US);
Hyun J. Kim, Sunnyvale, CA (US);
Swapneel Kekre, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1633 days.

(21) Appl. No.: 10/979,407

(22) Filed: Nov. 1, 2004

(65) Prior Publication Data
US 2006/0095909 A1    May 4, 2006

(51) Int. Cl.
*G06F 9/46* (2006.01)
(52) U.S. Cl. .................. 718/106; 718/105; 718/102
(58) Field of Classification Search ............. 718/1–108; 709/158
See application file for complete search history.

(56) References Cited

U.S. PATENT DOCUMENTS

| | | | | |
|---|---|---|---|---|
| 5,826,079 A | * | 10/1998 | Boland et al. | 718/102 |
| 5,872,972 A | * | 2/1999 | Boland et al. | 718/102 |
| 2002/0198924 A1 | * | 12/2002 | Akashi et al. | 709/102 |
| 2003/0153994 A1 | * | 8/2003 | Jin et al. | 700/99 |
| 2004/0010667 A1 | * | 1/2004 | Brenner | 711/158 |

* cited by examiner

*Primary Examiner*—Meng-Ai An
*Assistant Examiner*—Willy W Huaracha

(57) ABSTRACT

A method in a computer system for coordinating scheduling of threads among a plurality of processors. The method includes collecting, using a cooperative scheduling component (CSC), system data pertaining to the plurality of processors. The method further includes calculating, using the CSC, unified scheduling-related parameters (USRPs) from the system data. The method additionally includes furnishing the USRPs from the CSC to at least two of a thread launcher, a thread balancer, and a thread stealer, whereby at least two of the thread launcher, the thread balancer, and the thread stealer employ the USRPs to perform their respective scheduling-related tasks.

18 Claims, 5 Drawing Sheets

ADAPTIVE COOPERATIVE SCHEDULING

CROSS REFERENCE TO RELATED APPLICATIONS

The present invention is related to the following applications, all of which are incorporated herein by reference:

Commonly assigned application Ser. No. 10/979,060 titled "PER PROCESSOR SET SCHEDULING," filed on even date herewith by the same inventors herein, and Commonly assigned application Ser. No. 10/979,412 titled "AUTOMATIC POLICY SELECTION," filed on even date herewith by the same inventors herein.

BACKGROUND OF THE INVENTION

In a multi-processor computer system, a scheduler subsystem is often employed to schedule threads for execution on the various processors. One major function of the scheduler subsystem is to ensure an even distribution of work among the processors so that one processor is not overloaded while others are idle.

In a modern operating system, such as the HP-UX® operating system by the Hewlett-Packard Company of Palo Alto, Calif., as well as in many modern Unix and Linux operating systems, the scheduler subsystem may include three components: the thread launcher, the thread balancer, and the thread stealer.

With reference to FIG. 1, kernel 102 may include, in addition to other subsystems such as virtual memory subsystem 104, I/O subsystem 106, file subsystem 108, networking subsystem 110, process management subsystem 112, a scheduler subsystem 114. As shown, scheduler subsystem 114 includes three components: a thread launcher 120, a thread balancer 122, and a thread stealer 124. These three components are coupled to a thread dispatcher 138, which is responsible for placing threads onto the processor's per-processor run queues as will be discussed herein.

Thread launcher 120 represents the mechanism for launching a thread on a designated processor, e.g., when the thread is started or when the thread is restarted after having been blocked and put on a per-processor run queue (PPRQ). As is known, a per-processor run queue (PPRQ) is a priority-based queue associated with a processor. FIG. 1 shows four example PPRQs 126a, 126b, 126c, and 126d corresponding to CPUs 128a, 128b, 128c, and 128d as shown.

In the PPRQ, threads are queued up for execution by the associated processor according to the priority value of each thread. In an implementation, for example, threads are put into a priority band in the PPRQ, with threads in the same priority band being queued up on a first-come-first-serve basis. For each PPRQ, the kernel then schedules the threads therein for execution based on the priority band value.

To maximize performance, thread launcher 120 typically launches a thread on the least-loaded CPU. That is, thread launcher 120 instructs thread dispatcher 138 to place the thread into the PPRQ of the least-loaded CPU that it identifies. Thus, at least one piece of data calculated by thread launcher 120 relates the least-loaded CPU ID, as shown by reference number 130.

Thread balancer 122 represents the mechanism for shifting threads among PPRQs of various processors. Typically, thread balancer 122 calculates the most loaded processor and the least loaded processor among the processors, and shifts one or more threads from the most loaded processor to the least loaded processor each time thread balancer 122 executes. Accordingly, at least two pieces of data calculated by thread balancer 122 relate to the most loaded CPU ID 132 and the least loaded CPU ID 134.

Thread stealer 124 represents the mechanism that allows an idle CPU (i.e., one without a thread to be executed in its own PPRQ) to "steal" a thread from another CPU. Thread stealer accomplishes this by calculating the most loaded CPU and shifts a thread from the PPRQ of the most loaded CPU that it identifies to its own PPRQ. Thus, at least one piece of data calculated by thread stealer 124 relates the most-loaded CPU ID. The thread stealer performs this calculation among the CPUs of the system, whose CPU IDs are kept in a CPU ID list 136.

In a typical operating system, thread launcher 120, thread balancer 122, and thread stealer 124 represent independently operating components. Since each may execute its own algorithm for calculating the needed data, e.g., least-loaded CPU ID 130, most-loaded CPU ID 132, least-loaded CPU ID 134, the most-loaded CPU among the CPUs in CPU ID list 136, and the algorithm may be executed based on data gathered at different times, each component may have a different idea about the CPUs at the time it performs its respective task. For example, thread launcher 120 may gather data at a time t1 and executes its algorithm, which results in the conclusion that the least loaded CPU is CPU 128c. Thread balancer 122 may gather data at a time t2 and executes its algorithm, which results in the conclusion that the least loaded CPU is a different CPU 128a. In this case, each of thread launcher 120 and thread balancer 122 may operate correctly according to its own algorithm. Yet, by failing to coordinate (i.e., by executing their own algorithms and/or gathering system data at different times), they arrive at different calculated values.

The risk is increased for an installed OS that has been through a few update cycles. If the algorithm in one of the components (e.g., in thread launcher 120) is updated but there is no corresponding update in another component (e.g., in thread balancer 122), there is a substantial risk that these two components will fail to arrive at the same calculated value for the same scheduling parameter (e.g., the most loaded CPU ID).

The net effect is rather chaotic and unpredictable scheduling by scheduler subsystem 114. For example, it is possible for thread launcher 120 to believe that CPU 128a is the least loaded and would therefore place a thread A on PPRQ 126a associated with CPU 128a for execution. If thread stealer 124 is not coordinating its effort with thread launcher 120, it is possible for thread stealer 124 to believe, based on the data it obtained at some given time and based on its own algorithm, that CPU 128a is the most loaded. Accordingly, as soon as thread A is placed on the PPRQ 126a for execution on CPU 128a, thread stealer 124 immediately steals thread A and places it on PPRQ 126d associated with CPU 128d.

Further, if thread balancer 122 is not coordinating its effort with thread launcher 120 and thread stealer 124, it is possible for thread balancer 122 to believe, based on the data it obtained at some given time and based on its own algorithm, that CPU 128d is the most loaded and CPU 128a is the least loaded. Accordingly, as soon as thread A is placed on the PPRQ 126d for execution on CPU 128d, thread balancer 122 immediately moves thread A from PPRQ 126d back to PPRQ 126a, where it all started.

During this needless shifting of thread A among the PPRQs, the execution of thread A is needlessly delayed. Further, overhead associated with context switching is borne by the system. Furthermore, such needless shifting of threads among PPRQs may cause cache misses, which results in a waste of memory bandwidth. The effect on the overall performance of the computer system may be quite noticeable.

SUMMARY OF INVENTION

The invention relates, in an embodiment, to a method in a computer system for coordinating scheduling of threads among a plurality of processors. The method includes collecting, using a cooperative scheduling component (CSC), system data pertaining to the plurality of processors. The method further includes calculating, using the CSC, unified scheduling-related parameters (USRPs) from the system data. The method additionally includes furnishing the USRPs from the CSC to at least two of a thread launcher, a thread balancer, and a thread stealer, whereby the at least two of the thread launcher, the thread balancer, and the thread stealer employ the USRPs to perform their respective scheduling-related tasks.

In yet another embodiment, the invention relates to an arrangement in a computer system for coordinating scheduling of threads on a plurality of processors. The arrangement includes at least two of a thread launcher, a thread balancer, and a thread stealer. The thread launcher is configured to launch a first thread, responsive to a first subset of unified scheduling-related parameters (USRPs) pertaining to the plurality of processors, on at least a first processor of the plurality of processors. The thread balancer is configured to evacuate, responsive to a second subset of the USRPs, a second thread from a second processor of the plurality of processors to a third processor of the plurality of processors. The thread stealer being configured to evacuate, responsive to a third subset of the USRPs and on behalf of a fourth processor of the plurality of processors, a third thread from a fifth processor of the plurality of processors to the fourth processor. The arrangement includes a cooperative scheduling component (CSC) coupled to communicate with the at least two of the thread launcher, the thread balancer, and the thread stealer. The CSC is configured to provide the USRPs for use by the at least two of the thread launcher, the thread balancer, and the thread stealer.

In yet another embodiment, the invention relates to an article of manufacture comprising a program storage medium having computer readable code embodied therein. The computer readable code is configured to coordinate scheduling of threads among a plurality of processors. The article of manufacture includes computer readable code for collecting, using a cooperative scheduling component (CSC), system data pertaining to the plurality of processors. The article of manufacture also includes computer readable code for calculating, using the CSC, unified scheduling-related parameters (USRPs) from the system data. The article of manufacture further includes computer readable code for furnishing the USRPs from the CSC to at least two of a thread launcher, a thread balancer, and a thread stealer, whereby the at least two of the thread launcher, the thread balancer, and the thread stealer employ the USRPs to perform their respective scheduling-related tasks.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment of the invention, there is provided with a scheduler subsystem a cooperative scheduling component (CSC) configured to provide unified scheduling-related parameters (USRPs) pertaining to the system's processors to the thread launcher, the thread balancer, and the thread stealer in an operating system. In an embodiment, the CSC is configured to obtain system information in order to calculate scheduling-related parameters such as the most loaded processor, the least loaded processor, the starving processor(s), the non-starving processor(s), run-time behavior of threads, per-processor load information, NUMA (Non-Uniform Memory Access) topology, and the like. The scheduling-related parameters are then furnished to the thread launcher, the thread balancer, and the thread stealer to allow these components to perform their respective tasks.

Since the scheduling-related parameters are calculated by a single entity (i.e., the CSC), the prior art problem of having different components individually obtaining system data and calculating their own scheduling-related parameters at different times is avoided. In this manner, the CSC provides data coordination to prevent components from undoing each other's work.

Figure 1:
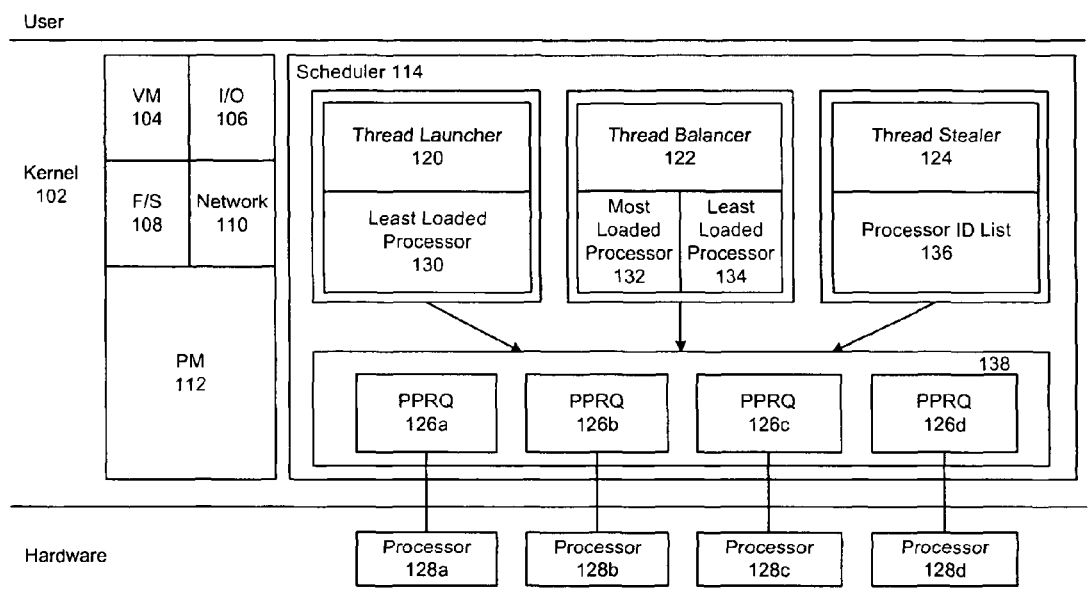
FIG. 1 is a prior art figure illustrating typical components of a scheduler in a computer system.
Figure 2:
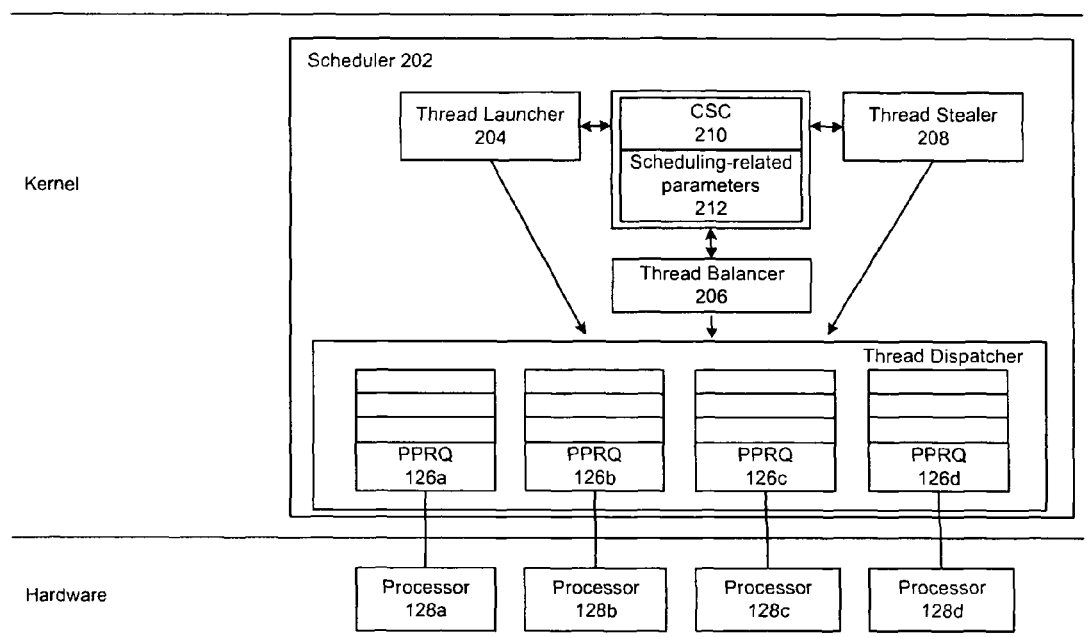
FIG. 2 shows, in accordance with an embodiment of the present invention, a CSC for coordinating scheduling activities among components of the scheduler in a computer system.

The features and advantages of embodiments of the invention may be better understood with reference to the figures and discussions that follow. FIG. 2 shows, in accordance with an embodiment of the present invention, a scheduler 202 having a thread launcher 204, a thread balancer 206, and a thread stealer 208. A cooperative scheduling component (CSC) 210 is configured to obtain system information, e.g., from the kernel, and to calculate scheduling-related parameters 212. CSC 210 is also shown coupled to communicate with thread launcher 204, thread balancer 206, and thread stealer 208 to provide any required subsets of scheduling-related parameters 212 to thread launcher 204, thread balancer 206, and thread stealer 208 to allow these components to perform their tasks.

By employing a single entity to obtain system data at various times and calculate the scheduling-related parameters using a single set of algorithms, embodiments of the invention ensure that thread launcher 204, thread balancer 206, and thread stealer 208 can obtain the same value when it requests the same scheduling parameter. For example, if both thread stealer 208 and thread balancer 206 both requests the identity of the most loaded processor, CSC 210 would be furnishing the same answer to both. This is in contrast to the prior art situation whereby thread stealer 208 may ascertain, using its own algorithm on data it obtained at some time (Tx), the most loaded processor and whereby thread balancer 206 may use a different algorithm on data it may have obtained at a different time (Ty) to ascertain the most loaded processor.

Figure 3:
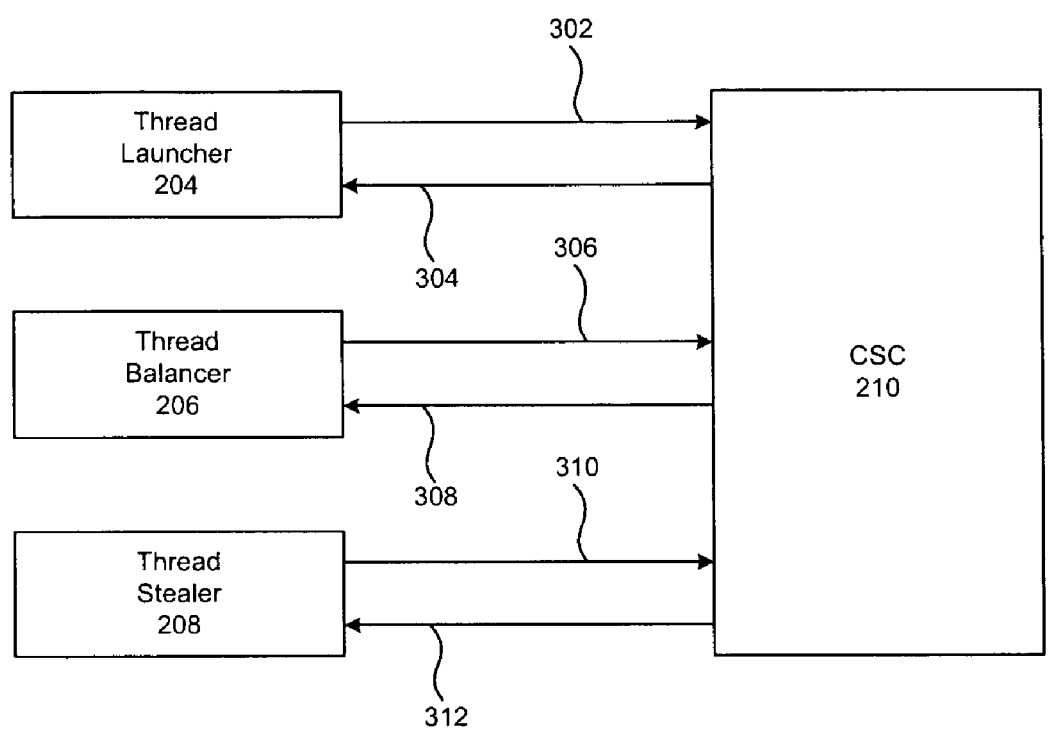
FIG. 3 shows, in accordance with an embodiment of the present invention, some of the inputs and outputs of the CSC to the thread launcher, the thread balancer, and the thread stealer.

FIG. 3 shows, in accordance with an embodiment of the present invention, some of the input and output of CSC 210 to thread launcher 204, thread balancer 206, and thread stealer 208. As mentioned, CSC 210 is configured to obtain system data (such as processor usage pattern, thread run-time behavior, NUMA system topology, and the like) to calculate scheduling-related parameters for use by thread launcher 204, thread balancer 206, and thread stealer 208.

Thread launcher 204 may request the identity of a processor to launch a thread, which request is furnished to CSC 210 as an input 302. CSC 210 may then calculate, based on the data it obtains from the kernel pertaining to the thread's run-time behavior and the usage data pertaining to the processors for example, the identity of the processor to be furnished (output 304) to thread launcher 204.

Likewise, load balancer 206 may request (input 306) the set of most loaded processors and the set of least loaded processors, as well as the most suitable candidate threads (i.e., the load-balancing candidate threads) to move from the set of the most loaded processors to the set of least loaded processors to achieve load balancing among the processors. These USRPs are then calculated by CSC 210 and furnished to thread balancer 206 (output 308). The calculation performed by CSC 210 of the most loaded processors and the least loaded processors may be based on per-processor usage data or per-processor load data, which CSC 210 may obtain from the kernel, for example. In an embodiment, the average usage level is established for the processors, along with an upper usage threshold and a lower usage threshold. Processors whose usage levels exceed the upper usage threshold may be deemed most loaded whereas processors whose usage levels fall below the lower usage threshold may be deemed least loaded. The candidate thread(s) may be obtained from the thread run-time behavior and NUMA topology data, for example. NUMA topology data may be relevant in the calculation since a thread may be executing more efficiently in a given NUMA domain and such consideration may be taken into account when determining whether a thread should be deemed a candidate to be evacuated.

Thread stealer 208 may request (input 310) the identity of the most loaded processor or processor in starvation state, along with the candidate thread to be moved away from that processor (input 3. Using the thread run-time behavior data, the per-processor load information, and/or NUMA topology data, CSC 210 ascertains the most loaded processor and candidate thread to furnish (output 312) those scheduling-related parameters to thread stealer 208.

Note that the scheduling parameters of FIG. 3, as well as the data employed for their calculations, are only examples. Different algorithms employed by CSC 210 may employ different data for their calculations. Likewise, different schedulers may employ a greater number of, fewer, or different scheduling parameters in their thread launcher, thread balancer, and thread stealer components.

Figure 4:
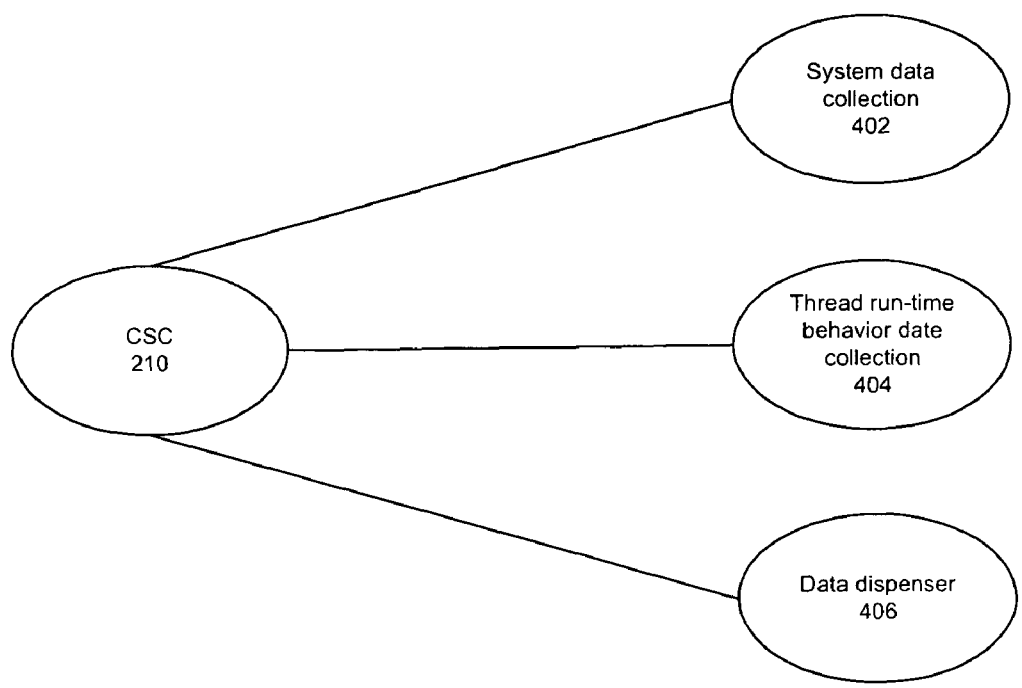
FIG. 4 shows, in accordance with an embodiment of the present invention, some of the tasks performed by the CSC.

CSC 210 may be thought of as the unified mechanism that performs three main tasks: system information collection (402 in FIG. 4), thread run-time behavior data collection (404), and dispensing USRPs to the components (406) for use in their respective tasks. As mentioned, the system information (e.g., per processor load information, NUMA topology, etc.) may be obtained, in one embodiment, from the kernel periodically. In an embodiment, the collected system information is employed to compute the USRPs upon collection. The USRPs are then stored in a centralized storage area to be dispensed to the components upon request. In an embodiment, the run-time behavior data of a thread is embedded into the thread itself (e.g., in the form of a cookie or other embedded data structure) to facilitate calculations that employ the run-time behavior data. As time progresses, more run-time behavior data is collected and/or processed, and is embedded in the thread for subsequent use, resulting in more efficient and/or more accurate calculations.

Figure 5:
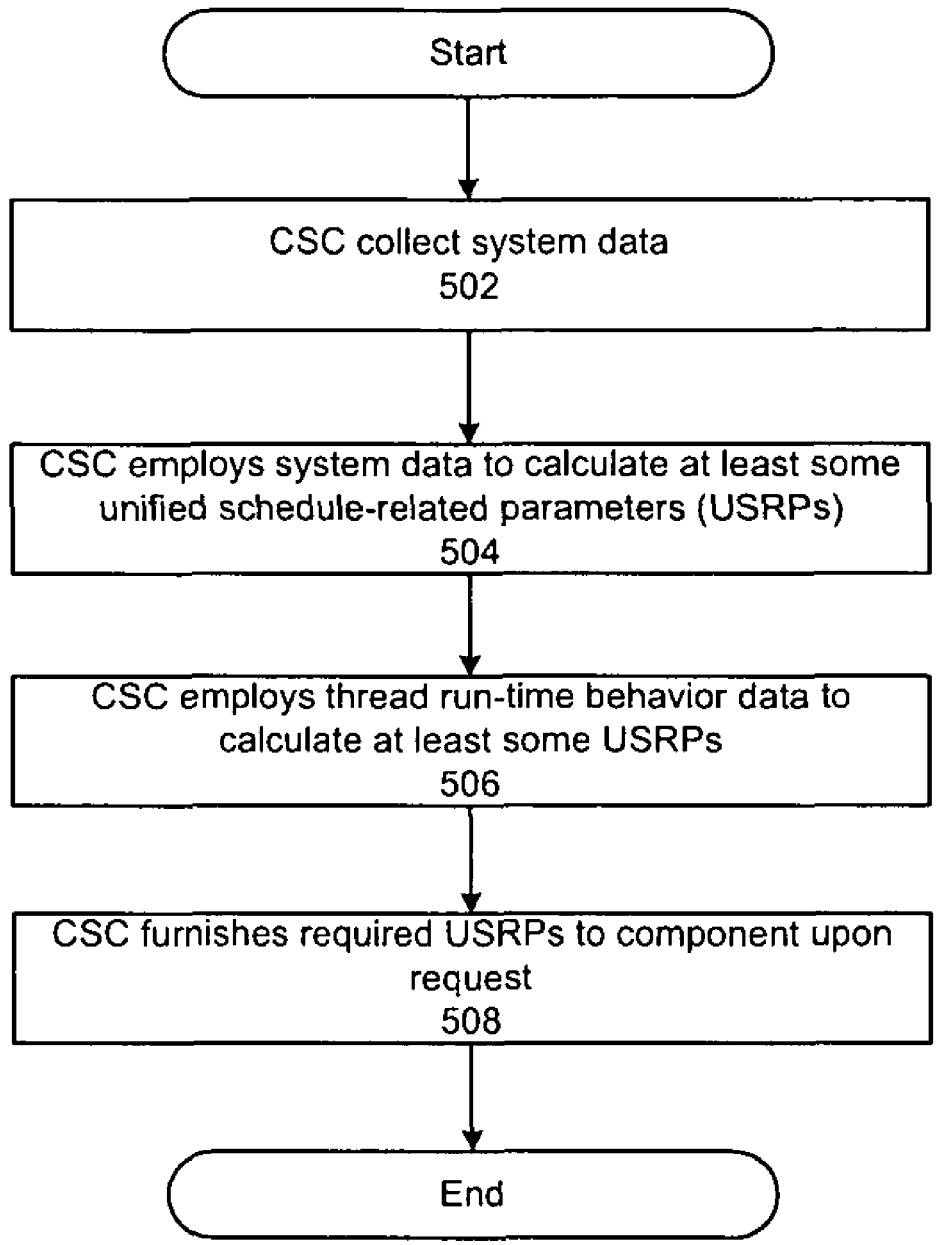
FIG. 5 shows, in accordance with an embodiment of the present invention, the steps taken to handle a request for scheduling-related parameters from one of the thread launcher, thread balancer, and thread stealer.

FIG. 5 shows, in accordance with an embodiment of the present invention, the steps taken to handle a request for scheduling-related parameters from one of the thread launcher, thread balancer, and thread stealer. In step 502, the system data is collected by the CSC. As mentioned, this data may take place on a periodic basis or on some pre-defined schedule. In step 504, the CSC employs the collected system data to compute at least some of the USRPs. In step 506, the CSC employs run-time behavior data to calculate other USRPs that require run-time behavior data in their calculations. In step 508, the required USRPs are furnished to the requesting component (e.g., one or more of the thread launcher, thread balancer, and thread stealer). Using the received USRPs, these components may then perform their respective tasks with minimal risks of adversely interfering with one another.

As can be appreciated from the foregoing, the invention prevents different components of the scheduling system from using conflicting data and/or data collected at different times and different schedules to calculate the same scheduling parameter (e.g., most loaded CPU). By using a single entity (e.g., the CSC) to calculate the required USRPs based on data collected by this single entity, the components are assured of receiving the same data when they request the same scheduling parameter. As such, the scheduler may be able to schedule the threads more efficiently since the probability of the components working against one another is substantially reduced.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system, a method for coordinating scheduling of threads among a plurality of processors, comprising:
    collecting, from a kernel of an operating system executing on said computer system, using a cooperative scheduling component (CSC), system data pertaining to said plurality of processors;
    calculating, using said CSC, unified scheduling-related parameters (USRPs) from said system data and thread run-time behavior data embedded in said threads; and
    furnishing said USRPs from said CSC to at least two of a thread launcher, a thread balancer, and a thread stealer, whereby said at least two of said thread launcher, said thread balancer, and said thread stealer employ said USRPs to perform their respective scheduling-related tasks.

2. The method of claim 1, wherein said USRPs are furnished to all three of said thread launcher, said thread balancer, and said thread stealer.

3. The method of claim 1, wherein said collecting is performed periodically by said CSC.

4. The method of claim 1, wherein said USRPs includes an identity of the most loaded processor among said plurality of processors.

5. The method of claim 1, wherein said USRPs includes an identity of the least loaded processor among said plurality of processors.

6. In a computer system, an arrangement for coordinating scheduling of threads on a plurality of processors, comprising:
    at least two of a thread launcher, a thread balancer, and a thread stealer, said thread launcher being configured to launch a first thread, responsive to a first subset of unified scheduling-related parameters (USRPs) pertaining to said plurality of processors, on at least a first processor of said plurality of processors,
    said thread balancer being configured to evacuate, responsive to a second subset of said USRPs, a second thread from a second processor of said plurality of processors to a third processor of said plurality of processors, and
    said thread stealer being configured to evacuate, responsive to a third subset of said USRPs and on behalf of a fourth processor of said plurality of processors, a third thread from a fifth processor of said plurality of processors to said fourth processor; and
    a cooperative scheduling component (CSC) coupled to communicate with said at least two of said thread launcher, said thread balancer, and said thread stealer, said CSC being configured to provide said USRPs for use by said at least two of said thread launcher, said thread balancer, and said thread stealer.

7. The arrangement of claim 6, wherein said CSC is coupled to communicate with all three of said thread launcher, said thread scheduler, and said thread stealer.

8. The arrangement of claim 6, wherein said first subset of said USRPs includes parameters pertaining to a processor identified by said CSC as a candidate for launching said first thread.

9. The arrangement of claim 6, wherein said second subset of said USRPs includes parameters pertaining to a load-balancing candidate thread, a first set of processors of said plurality of processors, and a second set of processors of said plurality of processors, said load-balancing candidate thread representing a thread identified by said CSC as a candidate to be evacuated to effect load balancing, said first set of processors representing a set of most loaded processors, said second set of processors representing a set of least loaded processors.

10. The arrangement of claim 9, wherein said load-balancing candidate thread is identified by said CSC based on run-time behavior.

11. The arrangement of claim 10, wherein said first set of processors and said second set of processors are selected by said CSCs based on per-processor load data.

12. The arrangement of claim 6, wherein said third subset of said USRPs includes parameters pertaining to the most loaded processor of said plurality of processors and a candidate thread identified by said CSC as a candidate to be evacuated to effect thread stealing on behalf of said fourth processor.

13. The arrangement of claim 6, wherein a scheduling-related parameter of said USRPs is calculated using run-time behavior data embedded in said threads.

14. A computer-readable medium having computer readable code embodied therein, said computer readable code being configured to coordinate scheduling of threads among a plurality of processors, comprising:
    computer readable code for collecting, from a kernel of an operating system executing on said computer system, using a cooperative scheduling component (CSC), system data pertaining to said plurality of processors;
    computer readable code for calculating, using said CSC, unified scheduling-related parameters (USRPs) from said system data and thread run-time behavior data embedded in said threads; and
    computer readable code for furnishing said USRPs from said CSC to at least two of a thread launcher, a thread balancer, and a thread stealer, whereby said at least two of said thread launcher, said thread balancer, and said thread stealer employ said USRPs to perform their respective scheduling-related tasks.

15. The computer-readable medium of claim 14, wherein said computer readable code for furnishing includes computer readable code for furnishing said USRPs to all three of said thread launcher, said thread balancer, and said thread stealer.

16. The computer-readable medium of claim 14, wherein said computer readable code for collecting is executed periodically.

17. The computer-readable medium of claim 14, wherein said USRPs includes an identity of the most loaded processor among said plurality of processors.

18. The computer-readable medium of claim 14, wherein said USRPs includes an identity of the least loaded processor among said plurality of processors.

* * * * *